United States Patent
Mercat et al.

(10) Patent No.: US 6,224,165 B1
(45) Date of Patent: *May 1, 2001

(54) METHOD FOR BORING A SPOKE RIM, RIM BORED ACCORDING TO THE METHOD, INSERT ADAPTED TO EQUIP THE RIM, AND WHEEL ESPECIALLY CYCLE RIM

(75) Inventors: Jean-Pierre Mercat, Chaneins; Alban Minville, Romaneche Thorens, both of (FR)

(73) Assignee: Mavic S.A., Saint Trivier sur Moignans (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,761

(22) Filed: Jul. 11, 1997

(30) Foreign Application Priority Data

Jul. 12, 1996 (FR) .................................................. 96 09047

(51) Int. Cl.⁷ .............................. B60B 1/02; B60B 21/00
(52) U.S. Cl. ................................................. 301/58; 301/95
(58) Field of Search ................................ 301/58, 67, 68, 301/69, 70, 71, 95, 96, 97, 98, 61; 29/894.35, 894.341, 894.342, 894.343

(56) References Cited

U.S. PATENT DOCUMENTS

| | | | |
|---|---|---|---|
| 183,647 | * 10/1876 | Danford | 301/95 |
| 399,453 | * 3/1889 | Warwick | 301/95 |
| 804,617 | * 11/1905 | Newton | 301/58 |
| 1,286,065 | * 11/1918 | Murray | 301/58 |
| 1,316,605 | * 9/1919 | Wagenhorst | 301/95 |
| 1,451,911 | * 4/1923 | Johnson | 301/96 |
| 1,469,769 | * 10/1923 | Booth | 301/95 |
| 1,584,576 | * 5/1926 | Wagenhorst | 301/95 |
| 1,649,678 | * 11/1927 | Freivogel | 301/95 |
| 2,937,905 | * 5/1960 | Altenburger | 301/95 |
| 4,583,787 | 4/1986 | Michelotti | 301/58 |
| 5,651,591 | 7/1997 | Mercat et al. | 301/95 |

FOREIGN PATENT DOCUMENTS

| | | |
|---|---|---|
| 4143380 | 5/1993 | (DE) . |
| 0130449 | 1/1985 | (EP) . |
| 0579525 | 1/1994 | (EP) . |
| 0 714 791 | 6/1996 | (EP) . |
| 2707559 | 1/1995 | (FR) . |
| 2722735 | 1/1996 | (FR) . |
| WO93/09963 | 5/1993 | (WO) . |
| 96/11075 | 4/1996 | (WO) . |

\* cited by examiner

*Primary Examiner*—S. Thomas Hughes
*Assistant Examiner*—Marc Jimenez
(74) *Attorney, Agent, or Firm*—Greenblum & Bernstein, P.L.C.

(57) ABSTRACT

The invention relates to a rim, spokes and a complete wheel, especially a cycle wheel, including such a rim and such spokes. The rim has a plurality of through holes demarcated by a chimney obtained by backflow. A threaded insert is housed in these openings. The end of the spoke includes a joining piece affixedly connected to the end of the spoke, a tension adjusting screw mounted to rotate freely on this side of the joining piece, and extended by a coupling sleeve with a tightening tool. The joining piece is provided to slide within the insert, and the screw is tightened within the joining piece.

9 Claims, 6 Drawing Sheets

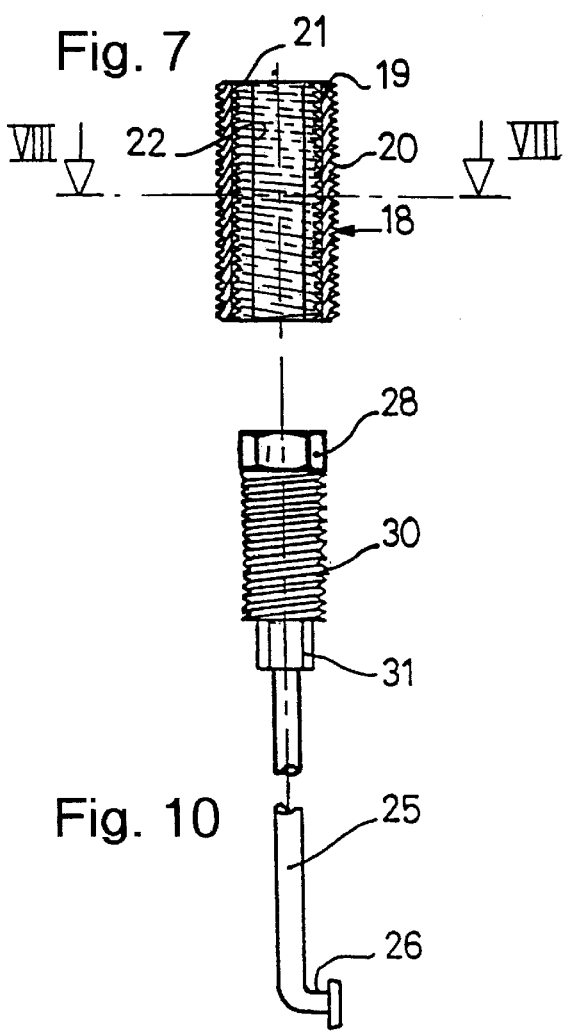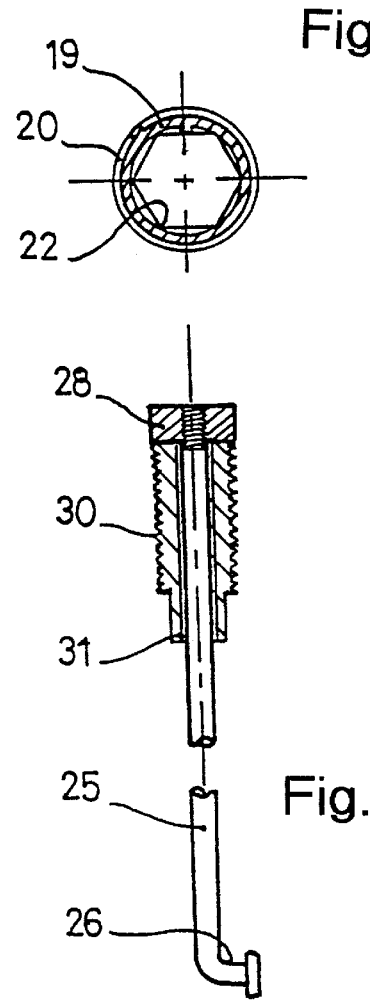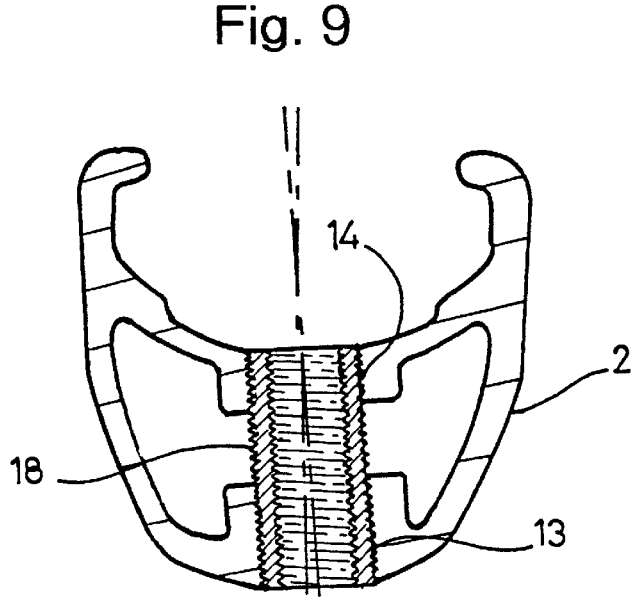

METHOD FOR BORING A SPOKE RIM, RIM BORED ACCORDING TO THE METHOD, INSERT ADAPTED TO EQUIP THE RIM, AND WHEEL ESPECIALLY CYCLE RIM

BACKGROUND OF THE INVENTION

1. Field of the Invention

The present invention relates to a method for boring a wheel spoke rim. The invention also relates to a rim obtained using the method. The invention is also related to a spoke, a spoke nipple provided to equip the rim obtained by the method, as well as a wheel obtained by assembling the rim with such spokes and spoke nipples.

2. Background and Material Information

In a known manner, a wheel, especially a bicycle wheel, includes a central hub connected to a circular rim by two rows of spokes. The rim is formed of two circular bridges connected by two lateral flanks so as to form a box. The lateral flanks are extended outwardly by two wings, so as to form, with the upper bridge, an annular channel provided to receive a tubular. For certain rims that are provided to receive a tube, the channel is a mere groove formed by a caving-in of the upper bridge. The spokes are connected to the rim by nipples screwed at the end of the spokes. These nipples further make it possible to adjust the tension of the spokes.

To receive the spoke nipples in a conventional manner, the two bridges of the rim are bored with openings spread along the circumference of the rim. The openings of the lower bridge are provided to serve as a seat for the nipple heads. The openings of the upper bridge, with a greater diameter, are provided to enable the positioning of the spoke nipple from the outside.

To improve the conditions in which the nipple head takes support against the rim, and the distribution, in the rim, of the stresses induced by the tension of the spokes, it is known to equip the rims with eyelets that extend through the openings of the lower bridge. These eyelets are assembled by crimping to the periphery of the opening of the lower bridge. They further have a cup-shaped eyelet body whose lower portion rests on the lower bridge, and the upper portion has an edge that rests against the upper bridge. The base of these eyelets is bored for the passage of the nipple body. These eyelets are advantageous because they establish mechanical linkages between the two bridges, which reinforces the structure of the rim and its bending strength.

A monoblock eyelet is described in the Patent Application EP 130 449. These eyelets also exist in the form of two distinct elements assembled at the level of the crimping.

However, for such rims, the opening of the bridges constitute local weakening zones which weaken each of the two bridges. In addition, these openings must have a relatively large size. The openings of the lower bridge must indeed have a diameter that is sufficient to allow for the passage of the nipple body and its free rotation. The openings of the upper bridge must enable the passage of the nipple head upon which the fastening of the spoke to the rim, as well as the adjustment tools are dependent.

Another problem of these rims is that when adjusting the tension of the spokes, the spoke itself is torsionally biased and twists over itself before a relative movement occurs at the level of the threads for linking with the nipple. As a result, the tension adjustment of the spokes is relatively inaccurate, and the spokes do not work properly.

Another problem of these rims comes from the manufacturing of the eyelets. Indeed, if one wishes to equip the rim with cup-shaped double eyelet, the distance between the two bridges of the rim is directly related to the height of the cup of the eyelet. Since the eyelet is conventionally made of stainless steel by stamping, the maximum height of an eyelet is thereby limited, which imposes dimensional constraints for the rim.

However, a rim having threaded openings is known from the published a Patent Application No. WO 93/09963. The threaded end of the spokes is connected to this rim by means of a nipple that is threaded internally and externally with a different pitch. This rim further has an unpunched upper bridge, except for the mounting of a valve, if necessary, which makes the rim airtight, and therefore appropriate for the mounting of a tubeless type of tire.

However, the lower bridge that is bored and threaded must be reinforced in its thickness to withstand the stresses, which results in an undesired increase in the weight and inertia of the rim. The mode for mounting the spokes does not solve the spoke twisting problem either.

SUMMARY OF THE INVENTION

An object of the invention is to propose a method for boring a rim which makes it possible to obtain a rim having improved mechanical characteristics, without any significant weight increase.

Another object of the invention is to propose a rim bored with openings which has an improved resistance to fracture.

Another object of the invention is to propose a rim in which the distance between the two bridges is freed from the height limit constraint for the cups of the eyelets.

Another object of the invention is to propose a wheel equipped with spokes whose tractional working conditions are improved.

Other objects and advantages of the invention will become apparent along the description that follows.

According to the invention, the method for making a rim bored with openings provided to receive spokes for linkage with a hub, the rim having a box with an upper bridge and a lower bridge, includes the feature that at least the lower bridge is bored with a through hole by means of flow drilling bit operating in the direction of the upper bridge.

The rim obtained using the method includes the feature that at least one of the bridges has a plurality of through holes demarcated by a backflow chimney whose height is greater than the thickness of the bridge.

The spoke provided to equip the preceding rim includes the feature that it has a joining piece affixedly assembled to the end of the spoke, and a tension adjusting screw mounted to rotate freely and set back with respect to the joining piece.

The wheel according to the invention has a rim such as aforementioned, a central hub and connecting spokes between the rim and the hub.

According to another characteristic, the rim includes at least one spoke such as aforementioned.

BRIEF DESCRIPTION OF DRAWINGS

The invention will be better understood along the following description, with reference to the annexed drawings that are an integral part thereof, and in which:

FIG. 7 shows a front and cross sectional view, through a transverse plane, of an insert provided to be screwed in the openings;

FIG. 8 is a top and cross sectional view of the insert of FIG. 7;

FIG. 9 shows the insert mounted in the rim;

FIG. 10 is a side view of a spoke provided to be assembled to the insert;

FIG. 11 is a view similar to FIG. 10 where the elements located at the end of the spoke are shown in cross section;

DETAILED DESCRIPTION OF THE PREFERRED EMBODIMENTS

Figure 1:
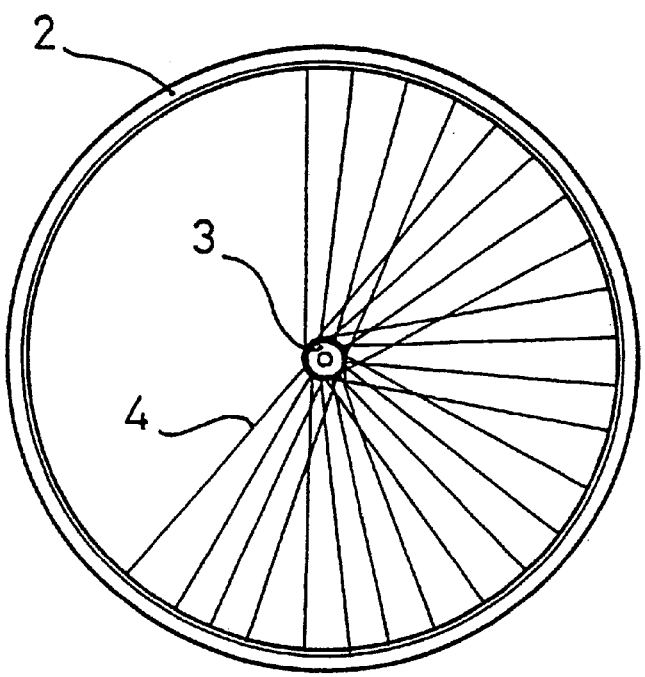
FIG. 1 is a general side view of a wheel.

FIG. 1 shows a bicycle wheel which includes a circular rim 2 connected to a central hub 3 by spokes 4. Only a portion of the spokes is shown in this FIG.. In a known manner, the hub has appropriate means for providing the linkage with the frame. As is visible in FIG. 2, the spokes are distributed also two symmetrical rows, each of which is fastened to an end of the hub 3.

Figure 2:
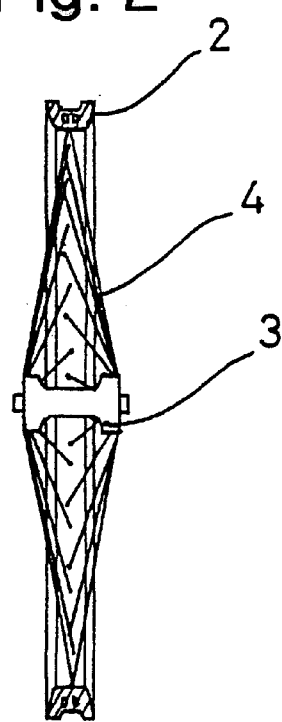
FIG. 2 is a front view of the wheel of FIG. 1.

The wheel shown in FIGS. 1 and 2 is a front wheel. In the case of a conventional rear wheel, one of the rows of spokes is offset toward the median portion of the hub, such that the hub has, on this side, a joining piece that includes the free wheel mechanism and serves as a support for the sprocket box. This is known to one with ordinary skills in the art.

Figure 3:
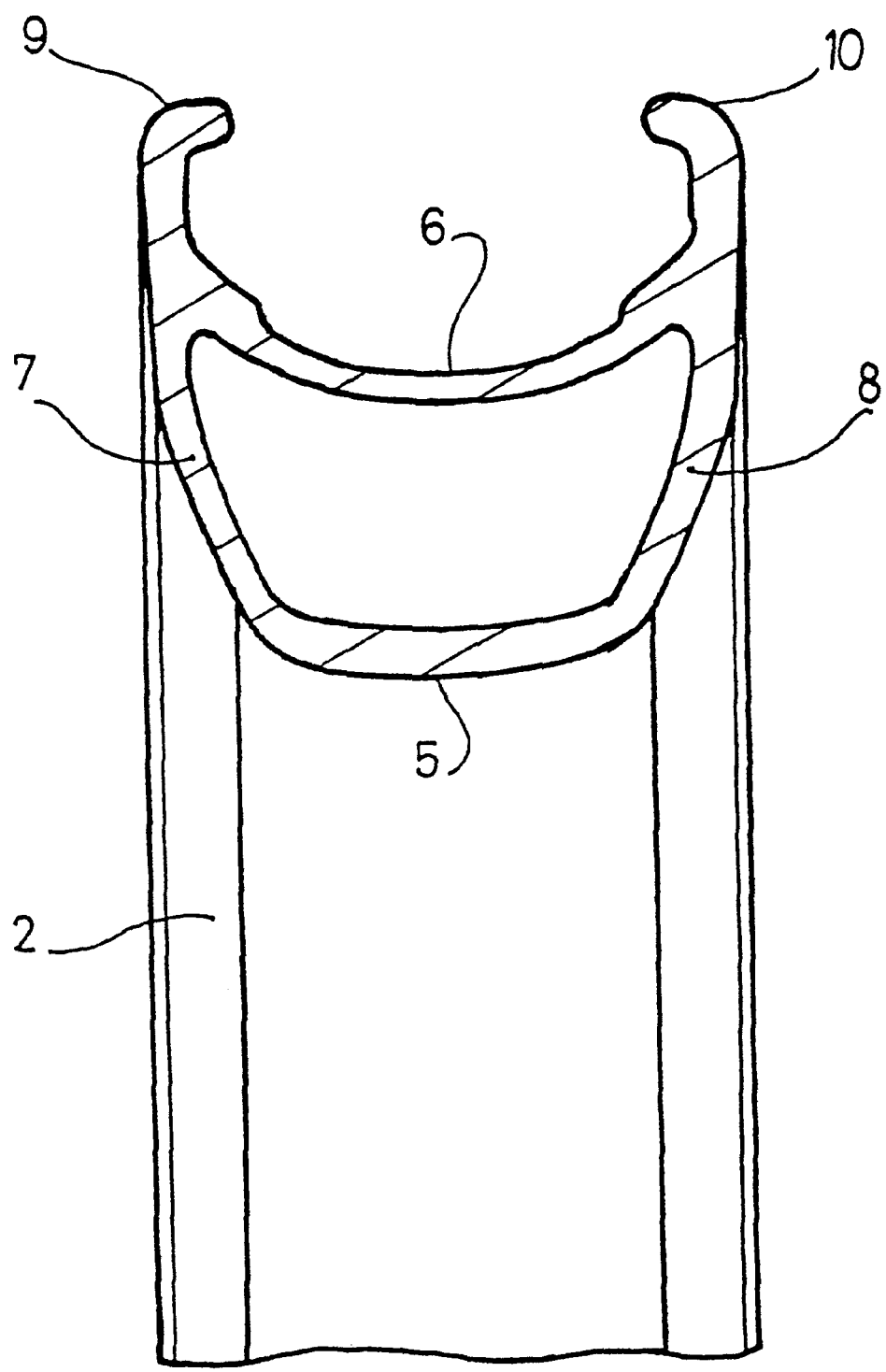
FIG. 3 is a partial front and cross sectional view, through a transverse plane of section, of a rim in the raw state.

FIG. 3, in a transverse cross section and partial view, shows the rim 2 in the raw state. This rim has, in a known manner, a box structure having a lower bridge 5 and an upper bridge 6 connected by lateral walls 7 and 8. These walls are extended beyond the upper bridge 6 by two wings 9 and 10 which form, with the bridge 6, an annular channel provided to receive a tire and a tube, if necessary.

The rim shown in the FIG. is however not limiting for the invention, neither with respect to the profile of the section, nor with respect to the mounting of a tire. The invention indeed applies to rims provided to be equipped with a tire as well as to rims provided to be equipped with a tube or any other tire tread.

In a known manner, the rim such as that shown in FIG. 3 is obtained from a shaped bar made of aluminum alloy or of any other light alloy, such bar being bent and then butt joined by means of a sleeve or by welding. In the raw state, the two bridges are unpunched continuous walls.

Figure 4:
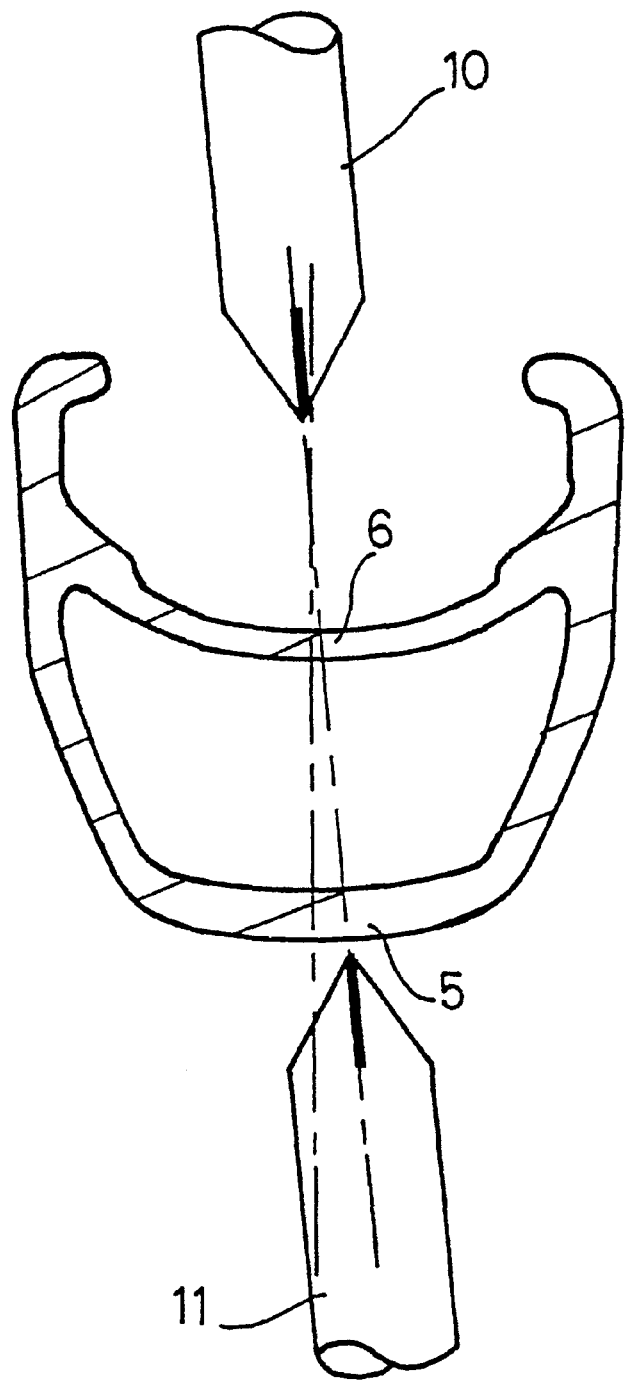
FIG. 4 illustrates the operation of boring the rim according to a first embodiment of the invention.
Figure 5:
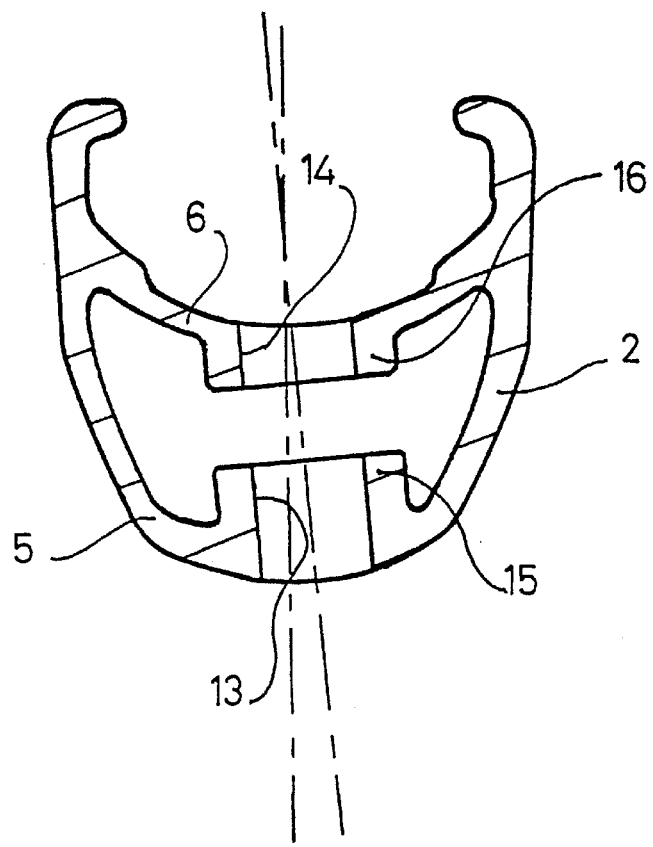
FIG. 5 shows the result of the boring operation.

FIGS. 4 and 5 illustrate the operation of boring the rim. This operation, in a known manner, consists of boring the two bridges of the rim at regular intervals, in order to enable the fastening of the spokes. It must be noted that the boring of the openings takes into account the specific orientation of each spoke, such orientation being determined by the general orientation of each row, and by the number of spokes per row.

According to the invention, the rims are bored, not by means of a conventional cutting drill, but by means of flow drilling drill bit. The flow drilling technique is known in itself. The drill bits used for such a boring have a generally cylindrical shape, with a punch-shaped tip. The tip is formed with edges, which gives it a general shape of pointed pyramid. Other tool shapes are also suitable.

Two tools 10 and 11 are used in the present case to bore the two bridges. They are coaxially mounted, and are driven in a rotational and translation movement in the direction of the rim by any appropriate means.

The flow drilling technique has the particularity of not cutting material, but rather of pushing it in the direction of progression of the drill bit along a chimney. In the present case, the chimneys are oriented toward the interior of the box of the rim.

Flow drilling can create a burr on the side opposite the chimney. This burr is trimmed off or shaped by the drilling tool itself which has at least on trimming tooth for this purpose. The burr can also be trimmed off or shaped by a proper machining operation.

FIG. 5 shows the rim in transverse cross section at the level of a pair of openings, after drilling and removal of the drill bits. Each bridge 5, 6, has a through hole 13, 14 demarcated by a chimney 15, 16, which extends toward the interior of the box. In the embodiment shown, the two openings 13 and 14 have the same diameter. This is not limiting, and as will be described subsequently, they can have a different diameter.

For each chimney, the height of the wall, and its thickness depend on the characteristics of the material of the rim, on the initial thickness of the bridge, on the diameter of the drill bit, and on drilling parameters, rotational speed, progression speed, etc.

One was able to obtain the following results.

For a rim made of aluminum alloy 6106, a 1.5 mm bridge was bored with a drill bit having a 5.5 mm diameter. The chimney obtained had a useful length of about 5 mm, this length including the thickness of the bridge.

It must be noted here that the boring of the openings using the flow drilling technique is advantageous with respect to the mechanical strength of the rim. Indeed, the structure of the material does no longer have any sudden discontinuity as is the case for a conventional boring by cutting. Due to its peripheral wall, the chimney maintains a certain homogeneity in the structure of the bridges, such that the mechanical resistance to fracture of the rim thus bored is higher than that of a rim bored in a conventional manner.

Another advantage is that such a flow drilling does not generate any chips; in particular, there is no chip that could penetrate into the box.

Finally, the two chimneys are oriented toward the interior of the box; therefore, there is no portion projecting outwardly, especially on the side provided for the tire or the tube.

Figure 6:
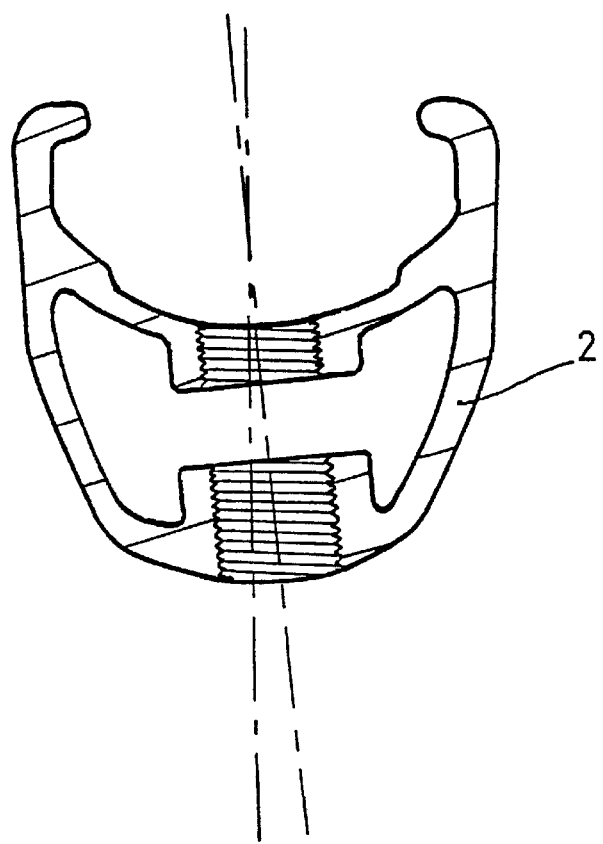
FIG. 6 illustrates the following step of threading the openings of the rim.

FIG. 6 illustrates the next manufacturing step which consist of threading the two openings 13 and 14 of the bridges. After threading, it is provided to screw a monoblock insert in the two openings, such that the two threads are made as a function of one another. If the two holes have the same diameter, the two threading operations can be carried out with a single tap in a single pass. If the openings have different diameters, a staged tap, or any other appropriate means, can be used.

The insert 18 provided to be screwed in the two threaded openings is shown in FIGS. 7 and 8. It has the shape of a tube portion that is threaded at its outer wall with respect to the diameter and pitch of the openings 13 and 14. Preferably, the length of the insert is equal to, or slightly less than the distance between the upper surface of the upper bridge 6 and the lower surface of the lower bridge 5, such that once screwed in the two openings of the bridges, the insert is totally integrated within the perimeter of a section of the rim.

The interior of the insert is also threaded to a pitch that is independent of the external pitch of the insert. In addition, the interior of the insert has, at least in its lower portion, a polygonal section, for example hexagonal, that is obtained in the thickness of the threading. Initially, this hexagonal section makes it possible to screw the insert in the openings 13 and 14 by means, for example, of an appropriate hexagonal wrench. As will appear hereinafter, the hexagonal shape also serves as an anti-rotation guide for a joining piece located at the end of the spoke. FIG. 8 shows the insert 18 in a top view, with its body 19, on the exterior of the body, a thread 20 of the external threading, and on the interior of the body, an internal thread 21 sectioned by six triangular grooves 22 that are disturbed at the peaks of a hexagon, and together define a hexagonal section.

Other means can also be suited to ensure the coupling with a tool in order to carry out the screwing of the insert, for example, one or more grooves provided in the inner wall of the insert along all or part of its height, and provided to cooperate with a tool carrying one or more lugs arranged appropriately.

Likewise, the insert could have on the side of the lower bridge, i.e., toward the interior of the rim, the projecting extension, with a hexagonal external section, for example, which enables the coupling of a screwing tool. This replaces the hexagonal section within the insert. This internal hexagonal section is however preferred, because it enables a weight gain on the inserts, as well as a saving in space, and it facilitates the spoke positioning which will be described in detail subsequently.

The insert is made of any appropriate material, such as aluminum alloy, for example.

The insert is provided to be screwed in the openings 13 and 14 of the rim, and preferably immobilized by any appropriate means, such as adhesion, for example. FIG. 9 illustrates this step of making the rim equipped with inserts.

Advantageously, the insert 18 provides a mechanical linkage between the two bridges 5 and 6, which operates both ways in a longitudinal direction defined by the insert. This is, contrary to the eyelets that are crimped on one of the bridges and in mere support on the other, the inserts here are embedded in each of the bridges, and they connect the bridges affixedly. The risk of the box collapsing is considerably reduced. The structure of the rim is stiffened by such linkages. It was already stiffened by the backflow chimneys. In addition, the flow drilling makes it possible to have, at the level of each bridge, a threading height that is much greater than the initial thickness of the wall of the bridge. In other words, a screwing linkage can be used here without significantly increasing the thickness of the wall. Furthermore, the length of the insert is not limited by manufacturing constraints, such that the distance which separates the two bridges of the rim is selected without any constraint relative to the length of the insert. The shape of the lower bridge can also be selectively more streamlined, for example, because the insert is no longer crimped but screwed within the rim.

A spoke provided to be fastened to the rim by screwing in the insert is shown in FIGS. 10 and 11.

The spoke 25 shown is a wire with a bent head 26 that is provided to be hooked to a lateral flange of a hub, by force fitting in one of the openings of the flange. Of course, this is not limiting, and the spoke could also have a strait head, i.e., with no bend, and could be assembled by any technique other than force fitting, for example, by a mere engagement of the head in a buttonhole-shaped housing, or in a cutout. The median portion of the spoke has any section, in particular, it can be cydrical or have an aerodynamic profile. The spokes could also be replaced by sticks assembled to the hub or integral therewith, the portion of the spokes which will now be described constituting the end portion of such sticks.

The spokes could also be formed from composite fibers.

This end portion includes a joining piece 28 that is affixed to the end of the spoke by any appropriate means, for example, screwing or adhesion on the threaded end of the spoke. The tip could also be assembled by welding, by caulking the end of the spoke, or it could be obtained by die forging the end of the same spoke. According to the mode of assembling the head of the spoke to the hub, especially by force fitting or by engagement into a slit, the joining piece is assembled after or prior to the operation of positioning the spoke on the hub.

The joining piece 28 has a polygonal section, for example hexagonal, which corresponds to the internal section of the insert. The joining piece is provided to engage and slide within the insert 18. The fact that the insert has an internal hexagonal section facilitates the positioning of the spoke, even before its tightening.

The cooperation between the hexagonal sections of the joining piece of the spoke and of the insert has the effect of retaining the end of the spoke in rotation, i.e., this prevents any twisting of the spoke. As has been said previously regarding the hexagonal section of the insert, any other appropriate means performing this function is suited.

At the rear of the joining piece, the end of the spoke carries a tension adjusting screw 30 which is traversed by the spoke and is mounted to rotate freely at its end. The screw is provided to abut against the joining piece 28 and to exert thereon a thrust that induces a tension in the spoke by reaction. The screw 30 is also provided to be tightened within the insert 18, thereby inducing a translation of the joining piece 28 within the insert.

Preferably, as is shown in FIGS. 10 and 11, the tension adjusting screw is extended on the side opposite the joining piece by a coupling sleeve with he tightening tool, such a sleeve 31 having a hexagonal section, for example. Any other appropriate means is also suitable.

Figure 12:
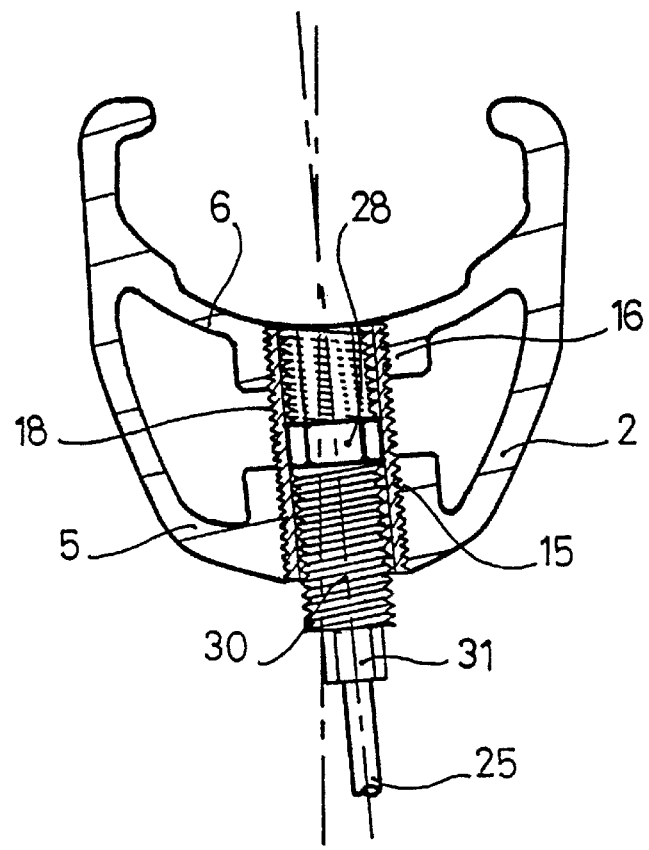
FIG. 12 shows the spoke assembled to the rim.

FIG. 12 schematically shows the rim in a plane of section including the insert.

This FIG. shows the various elements, in particular the insert 18 engaged in the two opening of the bridges 5 and 6 of the rim, the joining piece 28 slidably engaged in the insert, and the tension adjusting screw 30 partially screwed in the insert, with the coupling sleeve 31 accessible on the outside of the rim and which makes it possible to adjust the tension of the spoke. It must be noted that when adjusting the tension, the spoke only works in stretching since the joining piece 28 prevents the end of the spike from pivoting. The spokes work in better conditions and the tension adjustment is thereby more accurate.

The construction that has just been described can be carried out with numerous variations. For the linkage between the rim and the insert, it would be possible, for example, to use a drill bit which provides the threading of at least one of the openings during the same operation. One could also use self-threading inserts, i.e., which create their own threading when they are screwed. Another variation would consists of threading only one opening, for example the opening of the lower bridge, and the ensuring the linkage with the other bridge by means of a self-threading section of the insert. According to another variation, the two openings could be bored by a single oriented drill bit operating on the upper bridge, and then on the lower bridge. Such a boring would have the effect of orienting the chimney of the lower bridge toward the outside of the box. According to another variation, the two openings could have different diameters, the insert having in this case a shoulder on which it can rest to ensure its tightening in the openings. One could also use a blind insert on the side of the upper bridge.

Figure 13:
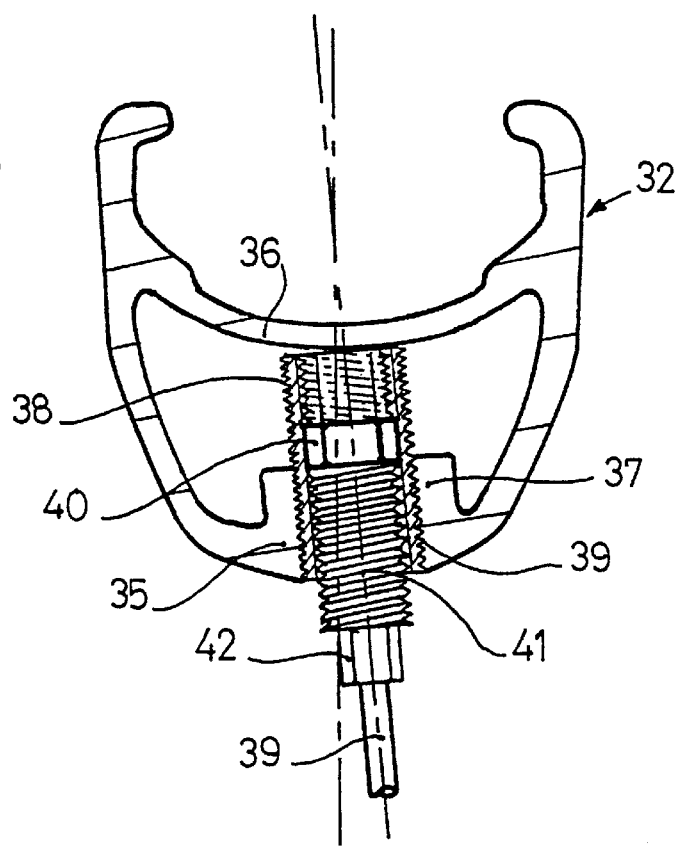
FIG. 13 is a view similar to FIG. 12 and illustrates another embodiment of the invdtion.

In this regard, FIG. 13 shows another embodiment of the invention. According to this embodiment, only the lower bridge 35 of the rim 32 is bored according to the flow drilling technique, so as to create a chimney 37. The upper bridge 36 is not bored, it remains in the raw state. As is in the preceding case, an insert 38 is engaged by screwing in the chimney 37, and is tightened against the upper bridge. The insert 38, as the insert 18, has an internal wall threaded and machined along a hexagonal section.

The spoke 39 provided to cooperate with the insert 38 is quite similar to the preceding spoke, having at its end a joining piece 40 with a hexagonal section, a tension adjusting screw 41 extended by a coupling sleeve with a tightening tool.

Such a construction has the advantage that the rim is impervious, i.e., on the side of the tire, it has a continuous bridge that is unpunched, except for the mounting of the valve, if necessary. Such a rim is appropriate for the mounting of a tubeless type of tire, or a mounting where only a portion of the volume defined by the tire is occupied by a tube or a filing material, the other portion being occupied by pressurized air injected between the rim and the tire.

This embodiment of the invention can also have alternatives of the same type as those that have been described previously.

Although the invention has been described with reference to particular means, materials, and embodiments, it is to be understood that the invention is not limited to the particulars expressly disclosed, but that the invention extends to all equivalents within the scope of the claims that follow.

This application is based upon French Patent Application No. 96 09047, filed on Jul. 12, 1996, the disclosure of which is hereby expressly incorporated by reference thereto in its entirety and the priority of which is claimed under 35 USC 119.

What is claimed is:

1. A bicycle wheel including a central hub, a rim and a plurality of tension spokes linking the rim and the hub, said rim comprising:

a one-piece circular profiled member centered around an axis of rotation of said central hub, said profiled member having a cross-section including a lower bridge arranged closer to the axis of rotation, an upper bridge arranged radially outward of said lower bridge, and a pair of lateral walls interconnecting said lower bridge and said upper bridge and extending radially outwardly beyond said upper bridge to form a pair of wing portions, said wing portions and said upper bridge defining an annular channel for receiving a tire; and at least one through hole in at least said lower bridge, said at least one through hole being demarcated by a tubular backflow chimney having a height greater than a thickness of said at least lower bridge, and said backflow chimney extending from said lower bridge toward said upper bridge.

2. A wheel according to claim 1, wherein each of said spokes includes a joining piece fixedly connected directly to one end thereof, a tension adjusting screw mounted on each of said spokes to rotate freely with respect to said joining piece and to said spoke, and said tension adjusting screw abuts said joining piece.

3. A wheel according to claim 2, wherein each of said tension adjusting screws includes a polygonal body portion for engagement by an adjusting tool.

4. A wheel according to claim 2, wherein each said joining piece includes a polygonal portion.

5. A wheel according to claim 2, further comprising a threaded portion provided in each of the chimneys for receiving a respective tension adjusting screw of said spokes.

6. A wheel according to claim 5, wherein each said threaded portion includes a plurality of grooves for receiving a polygonal portion provided on each said joining piece.

7. A wheel according to claim 5, wherein each of said threaded portions is formed on an insert provided in each chimney.

8. A wheel according to claim 7, wherein each of said inserts includes a threaded exterior portion for threadedly engaging a respective chimney and a threaded interior portion for receiving a tension adjusting screw of a respective spoke.

9. A wheel according to claim 1, wherein said generally tubular backflow chimney is formed by flowdrilling.

* * * * *